United States Patent
Yuki et al.

(10) Patent No.: US 12,280,402 B2
(45) Date of Patent: Apr. 22, 2025

(54) ARTICLE SORTING DETERMINATION DEVICE

(71) Applicant: ISHIDA CO., LTD., Kyoto (JP)

(72) Inventors: Shinya Yuki, Ritto (JP); Kazuyuki Sugimoto, Ritto (JP); Yoshiaki Sakagami, Ritto (JP); Futoshi Yurugi, Ritto (JP)

(73) Assignee: ISHIDA CO., LTD., Kyoto (JP)

( * ) Notice: Subject to any disclaimer, the term of this patent is extended or adjusted under 35 U.S.C. 154(b) by 0 days.

(21) Appl. No.: 18/786,428

(22) Filed: Jul. 26, 2024

(65) Prior Publication Data

US 2025/0041902 A1    Feb. 6, 2025

(30) Foreign Application Priority Data

Aug. 3, 2023    (JP) ................................. 2023-126926

(51) Int. Cl.
　　*B07C 5/34*　　(2006.01)
　　*B07C 5/10*　　(2006.01)

(52) U.S. Cl.
　　CPC .............. *B07C 5/3416* (2013.01); *B07C 5/10* (2013.01)

(58) Field of Classification Search
　　CPC .......... B07C 5/34; B07C 5/3416; B07C 5/342
　　USPC ................................................. 209/552, 589
　　See application file for complete search history.

(56) References Cited

U.S. PATENT DOCUMENTS

| | | | | |
|---|---|---|---|---|
| 4,818,380 A * | 4/1989 | Azegami | ................. | B07C 5/10 209/912 |
| 5,070,237 A * | 12/1991 | Okuyama | .......... | G01N 21/8901 250/559.19 |
| 7,049,621 B2 * | 5/2006 | Bassi | ................. | D05B 23/007 250/559.4 |
| 9,791,591 B2 * | 10/2017 | Sugimoto | .............. | G01N 23/04 |
| 2002/0170850 A1 * | 11/2002 | Bonham | ................ | B65G 47/44 209/589 |
| 2014/0166549 A1 * | 6/2014 | Ito | ........................ | B65G 11/023 209/552 |
| 2021/0299704 A1 * | 9/2021 | Bell | ........................ | B07C 3/02 |

(Continued)

FOREIGN PATENT DOCUMENTS

| | | | | |
|---|---|---|---|---|
| CN | 112278591 A | * | 1/2021 | ............ B65D 25/14 |
| JP | 2013152127 A | * | 8/2013 | |

(Continued)

OTHER PUBLICATIONS

Extended Search Report in the corresponding European Patent Application No. 24191994.3 dated Dec. 4, 2024.

*Primary Examiner* — Terrell H Matthews

(74) *Attorney, Agent, or Firm* — Global IP Counselors, LLP

(57) ABSTRACT

An article sorting determination device including a conveying unit configured to convey an article, an acquisition unit configured to acquire first information and second information, the first information relating to a size of the article being conveyed by the conveying unit and the second information relating to a width of a passage port through which the article passes through downstream of the conveying unit; and a control unit configured to output a sorting signal for sorting the article from the conveying unit when determining that the article would get stuck in the passage port on the basis of the first information and the second information.

6 Claims, 8 Drawing Sheets

(56) References Cited

U.S. PATENT DOCUMENTS

2022/0050066 A1 2/2022 Ohtani et al.
2024/0130286 A1* 4/2024 Hayashi .................... B07C 5/10

FOREIGN PATENT DOCUMENTS

| JP | 2016-002632 A | 1/2016 |
| JP | 2016-024096 A | 2/2016 |

* cited by examiner

ARTICLE SORTING DETERMINATION DEVICE

CROSS REFERENCE TO RELATED APPLICATIONS

This application claims the benefit of priority to Japanese Patent Application Number 2023-126926 filed on Aug. 3, 2023. The entire contents of the above-identified application are hereby incorporated by reference.

TECHNICAL FIELD

An aspect of the disclosure relates to an article sorting determination device.

BACKGROUND

For example, as a technique relating to an article sorting determination device, JP 2013-152127 A describes an X-ray inspection device that detects a dose of X-rays transmitted through an article being conveyed by a conveying unit and inspects the article for defects, on the basis of the detection result. The X-ray inspection device described in JP 2013-152127 A transmits an inspection result to a sorting mechanism provided downstream of the X-ray inspection device, and causes the sorting mechanism to sort the articles into non-defective articles and defective articles.

SUMMARY

In the above-described technique, when the article is large, the article may get stuck in a passage port (for example, a passage chute in a weighing and packaging system) in a subsequent stage of the conveying unit.

Therefore, an object of an aspect of the disclosure is to provide an article sorting determination device that can help prevent an article from getting stuck in a passage port in a subsequent stage.

(1) An article sorting determination device according to one aspect of the disclosure includes a conveying unit configured to convey an article, an acquisition unit configured to acquire first information and second information, the first information relating to a size of the article being conveyed by the conveying unit and the second information relating to a width of a passage port through which the article passes at downstream of the conveying unit, and a control unit configured to output a sorting signal for sorting the article from the conveying unit, when determining, on the basis of the first information and the second information, that the article would get stuck in the passage port.

In the article sorting determination device, when an article is larger than the width of the passage port, the control unit determines that the article would get stuck in the passage port and outputs the sorting signal. Thus, by operating a sorting device on the basis of the sorting signal, it is possible to sort and remove from the conveying unit an article that is larger than the width of the passage port. Therefore, it is possible to help prevent the article from getting stuck in the passage port in a subsequent stage.

(2) In the article sorting determination device described above in (1), a cutting device configured to cut the article to produce an article piece may be disposed in the conveying unit, and the control unit may obtain, on the basis of the first information, third information relating to a size of the article piece after cutting the article, and output the sorting signal when determining, as a result of comparing the second information and the third information, that the article would get stuck in the passage port. In this case, it is possible to accurately determine whether the article would get stuck in the passage port, and it is possible to reliably help prevent the article from getting stuck in the passage port in a subsequent stage.

(3) In the article sorting determination device described above in (1) or (2), the control unit may output the sorting signal to a sorting device disposed upstream from the cutting device to sort the article prior to cutting from the conveying unit. When the article is larger than a predetermined standard size, the article piece produced by cutting is also relatively large, and thus, it is possible to prevent the article from getting stuck by sorting an article prior to cutting from the conveying unit.

(4) In the article sorting determination device described above in any one of (1) to (3), the second information may be information relating to a width of a passage port of a member included in a combination weighing device or a vertical packaging device disposed downstream of the conveying unit. In this case, it is possible to help prevent the article from getting stuck in the passage port of the combination weighing device or the vertical packaging device disposed downstream of the conveying unit.

(5) In the article sorting determination device described above in any one of (1) to (4), the control unit may acquire a total weight of the articles conveyed in a predetermined time period by the conveying unit, excluding a weight of one or a plurality of the articles sorted from the conveying unit, and control a setting of an article processing device disposed downstream of the conveying unit. In this case, it is possible to appropriately set the article processing device (for example, a fryer).

(6) The article sorting determination device described above in any one of (1) to (5) may further include an X-ray irradiation unit configured to irradiate the article being conveyed by the conveying unit with X-rays, a detection unit configured to detect the X-rays transmitted through the article, and an inspection unit configured to generate a transmission image on the basis of the X-rays detected by the detection unit and inspect the article by using the transmission image that is generated, the acquisition unit may acquire the first information on the basis of the transmission image, and the control unit may output a sorting signal for sorting the article from the conveying unit even when determining that the article is abnormal as a result of the inspection. In this case, an article different from a predetermined standard, an article including foreign matter, or foreign matter (for example, a stone or the like) are sorted in advance from the articles being fed, so that it is possible to prevent an article from getting stuck or a product from being contaminated with foreign matter. Therefore, it is possible to prevent damage to a device (for example, a blade of the cutting device) in a subsequent stage.

According to an aspect of the disclosure, it is possible to provide an article sorting determination device that can help prevent an article from getting stuck in a passage port in a subsequent stage.

DESCRIPTION OF EMBODIMENTS

Embodiments will be described below with reference to the drawings. In the description below, the same elements or corresponding elements are denoted by the same reference signs, and redundant descriptions thereof are omitted.

Figure 1:
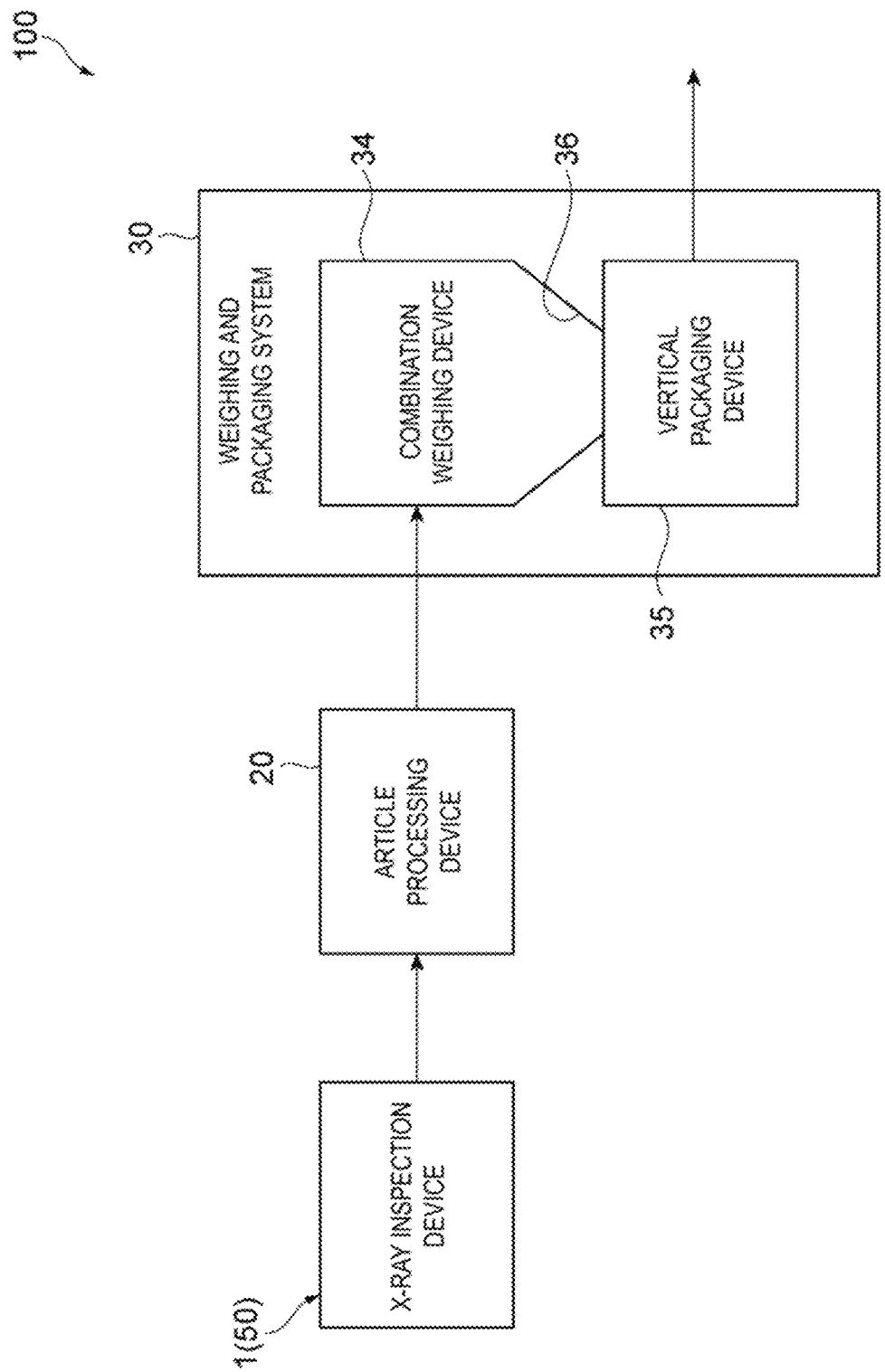
FIG. 1 is a configuration diagram illustrating an article processing system according to an embodiment.
Figure 2:
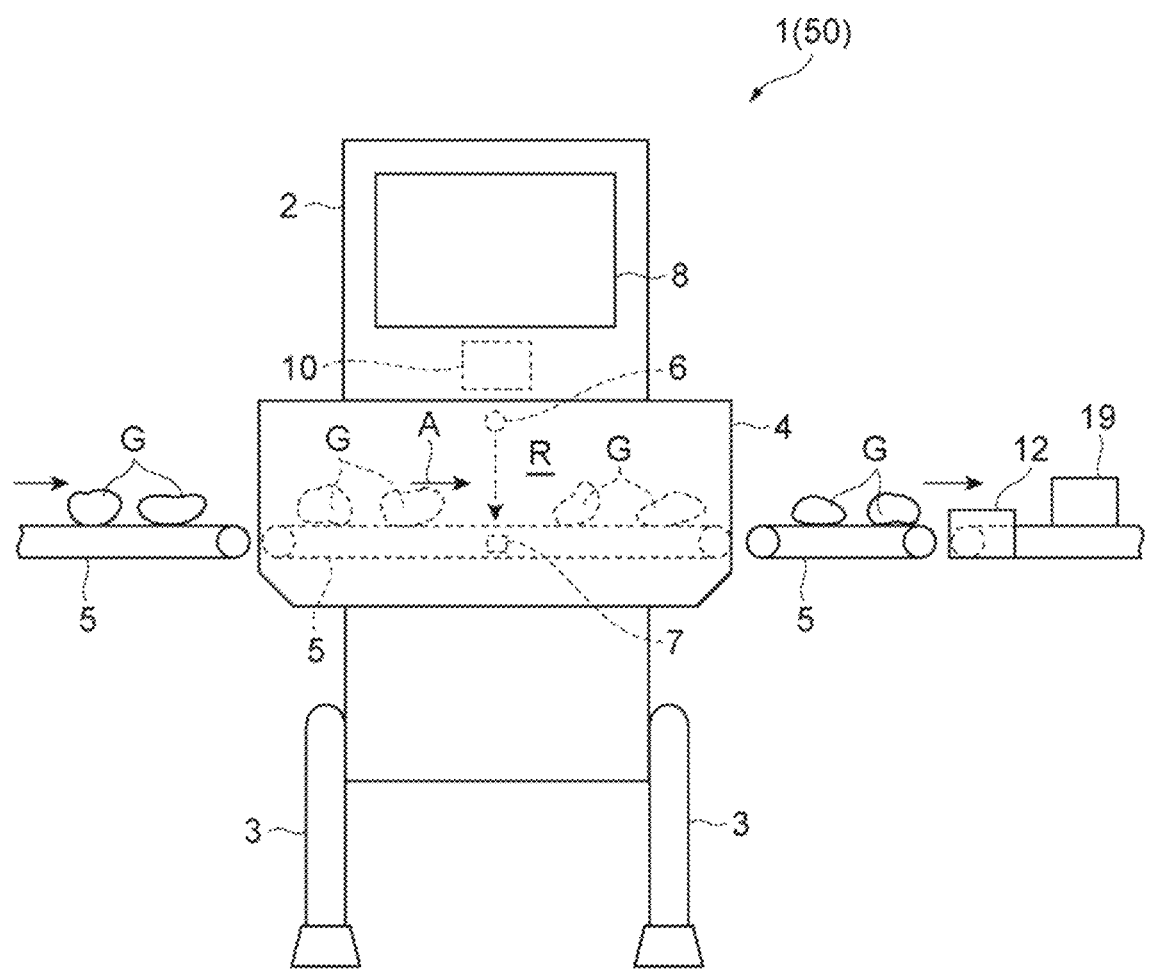
FIG. 2 is a schematic front view illustrating an X-ray inspection device in FIG. 1.

As illustrated in FIGS. 1 and 2, an article sorting determination device 50 of the present embodiment is provided in an X-ray inspection device 1. The X-ray inspection device 1 constitutes an article processing system 100. The article processing system 100 is a system for processing an article G and is used in a manufacturing line for food products, for example. The article G does not have a constant size and shape (in other words, does not have a constant weight) and is a so-called loose product. Examples of the loose product include dry products such as nuts, dried fruits, dried ingredients, and rice confectionery; and wet products such as minced meat, meat, seafood, frozen foods, and agricultural products. The article G is not particularly limited. In the present embodiment, potatoes are processed as the article G, and potato chips are produced as a commercial product. The article processing system 100 includes the X-ray inspection device 1, an article processing device 20, and a weighing and packaging system 30.

The X-ray inspection device 1 generates an X-ray transmission image of the article G while conveying the article G, and conducts an inspection (e.g., an accommodated quantity inspection, a foreign matter inspection, a missing part inspection, or a chip/crack inspection) of the article G on the basis of the X-ray transmission image. The article processing device 20 is disposed at a subsequent stage of the X-ray inspection device 1. The article processing device 20 conveys and processes the article G that has passed through the X-ray inspection device 1. For example, the article processing device 20 includes a fryer and fries the article G while conveying the article G.

The weighing and packaging system 30 is disposed at a subsequent stage of the article processing device 20. The weighing and packaging system 30 weighs and packages the article G conveyed by a conveying unit 5 (see FIG. 2) of the X-ray inspection device 1 and processed by the article processing device 20. The weighing and packaging system 30 includes a combination weighing device 34 and a vertical packaging device 35.

The combination weighing device 34 is a device that performs calculation to obtain a combination of the article G. The combination weighing device 34 supplies a plurality of articles G, a combination of which has a target weight value, to the vertical packaging device 35 via a passage chute 36. The passage chute 36 constitutes a passage port through which the articles G pass between the combination weighing device 34 and the vertical packaging device 35 (at a subsequent stage of the conveying unit 5 (see FIG. 2)). For example, the passage chute 36 constitutes a passage port having a circular cross section. The vertical packaging device 35 is a device that while producing a bag, manufactures a product M by packaging in the bag the plurality of articles G supplied from the combination weighing device 34. A boxing device (not illustrated) fills a cardboard box with the articles G that are weighed and packaged by the weighing and packaging system 30, and the cardboard box is conveyed to a downstream process.

The X-ray inspection device 1 will be described in detail. The X-ray inspection device 1 includes a device main body 2, support legs 3, a shield box 4, the conveying unit 5, an X-ray irradiation unit 6, an X-ray detection unit 7, a display operation unit 8, and a control unit 10. When the article G is determined as being a defective article by the X-ray inspection device 1, the article G is sorted out from the production line by a sorting device 12 disposed downstream of a carry-out conveyor 52. When the article G is determined as being a non-defective article by the X-ray inspection device 1, the article G passes through the sorting device 12.

The sorting device 12 is a device that removes the article G determined as being a defective article from a conveyance path of the conveying unit 5. The sorting device 12 is not particularly limited. For example, a drop-up belt-type sorting device, an arm-type sorting device using an arm, a pusher-type sorting device using a pusher device, a drop-flap type sorting device, an air-jet type sorting device, and a fin-type sorting device may be adopted as the sorting device 12.

The sorting device 12 is disposed upstream of a cutting device 19.

The device main body 2 accommodates the control unit 10 and other constituent elements. The support legs 3 support the device main body 2. The shield box 4 is provided at the device main body 2. The shield box 4 prevents leakage of X-rays (electromagnetic waves) to the outside. Inside the shield box 4, an inspection region R is provided where the article G is inspected by X-rays. The conveying unit 5 conveys the article G along a conveyance direction A. The conveying unit 5 conveys the article G before being processed by the article processing device 20. For example, the conveying unit 5 includes a plurality of belt conveyors. The conveying unit 5 is disposed so as to extend through a center of the shield box 4. The cutting device 19 that cuts the article G to produce an article piece is disposed in the conveying unit 5.

Figure 3:
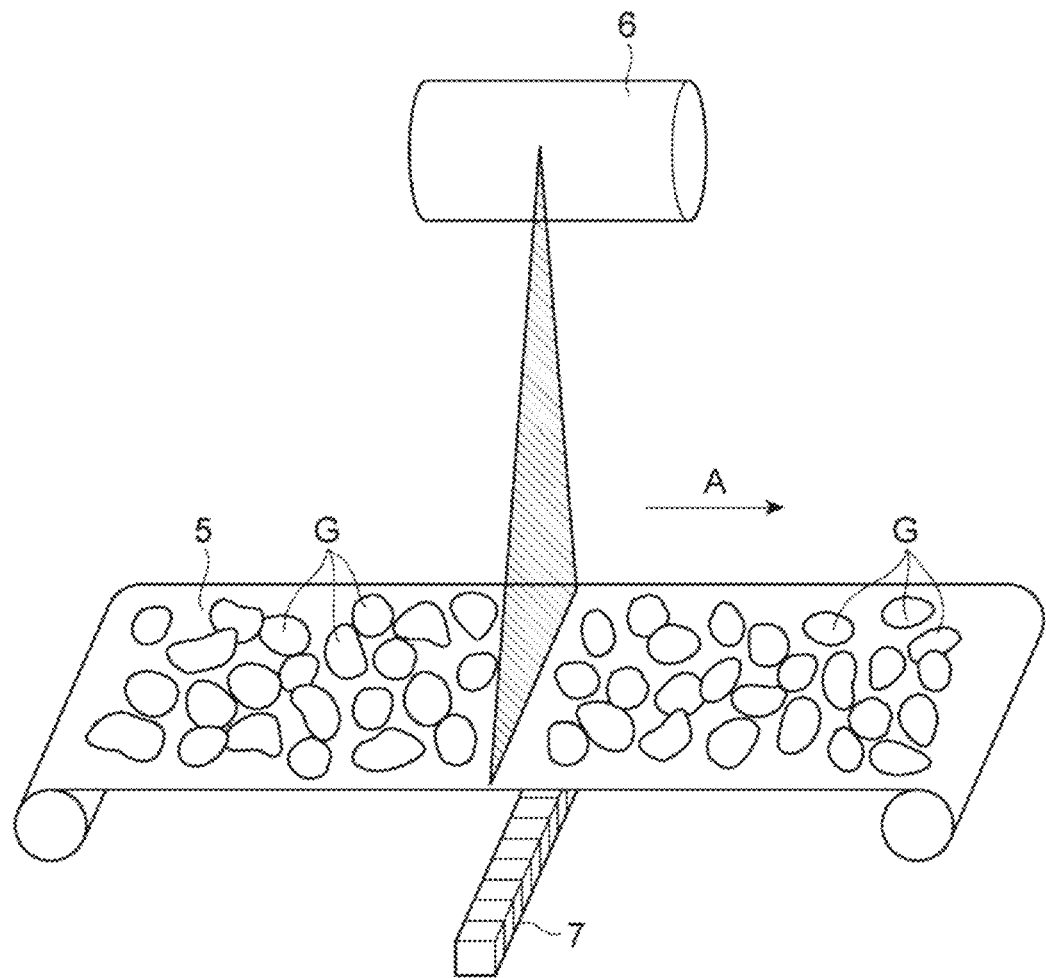
FIG. 3 is a configuration diagram illustrating an interior of a shield box in FIG. 1.

As illustrated in FIGS. 2 and 3, the X-ray irradiation unit 6 irradiates the article G being conveyed by the conveying unit 5 with X-rays. The X-ray irradiation unit 6 is an electromagnetic wave irradiation unit (X-ray source) disposed in the shield box 4. The X-ray irradiation unit 6 includes, for example, an X-ray tube that emits X-rays and a diaphragm unit that widens the X-rays emitted from the X-ray tube into a fan-like shape in a plane perpendicular to the conveyance direction A.

The X-ray detection unit 7 is a sensor member that detects electromagnetic waves. The X-ray detection unit 7 is a detection unit that detects X-rays transmitted through the article G. The X-ray detection unit 7 is disposed in the shield box 4 at a position facing the X-ray irradiation unit 6 in an up-down direction. The X-ray detection unit 7 may be configured to detect X-rays in a specific energy band or may be configured to detect X-rays by a photon counting method. The X-ray detection unit 7 may be a direct conversion type detection unit or an indirect conversion type detection unit. The X-ray detection unit 7 includes X-ray detection elements aligned at least in a direction (width direction) orthogonal to the conveyance direction of the conveying unit 5 and the up-down direction, for example. That is, the X-ray detection unit 7 may be a line sensor or a sensor group disposed two-dimensionally.

The display operation unit 8 is provided in the device main body 2. The display operation unit 8 displays various types of information and receives input operations under various conditions from an external source. The display operation unit 8 is, for example, a liquid crystal display and displays an operation screen as a touch panel. In this case, an operator can input various conditions via the display operation unit 8.

Figure 4:
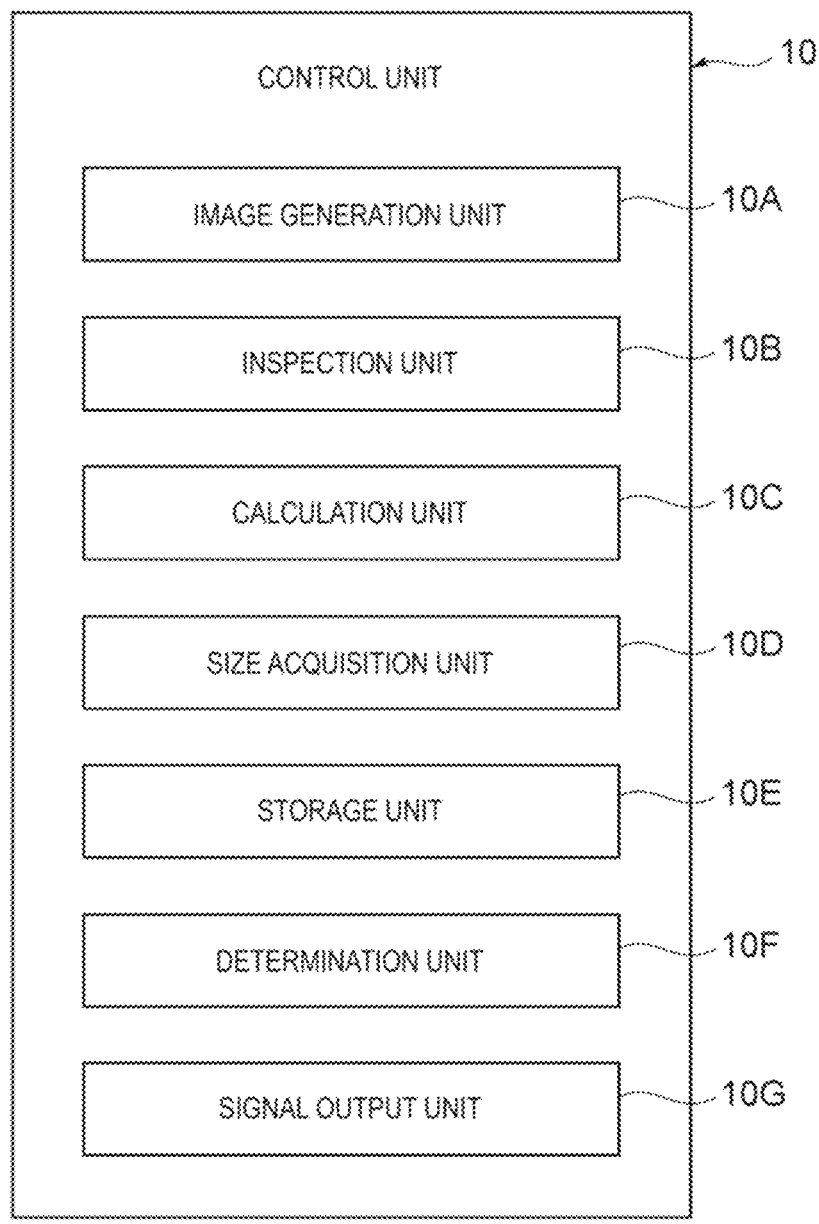
FIG. 4 is a block diagram illustrating a functional configuration of a control unit in FIG. 2.

The control unit 10 is disposed in the device main body 2. The control unit 10 controls the operation of each component of the X-ray inspection device 1. The control unit 10 includes a processor such as a central processing unit (CPU), a memory such as a read only memory (ROM) and a random-access memory (RAM), and a storage such as a solid state drive (SSD). The ROM records a program for controlling the X-ray inspection device 1. As illustrated in FIG. 4, the control unit 10 includes an image generation unit 10A, an inspection unit 10B, a calculation unit 10C, a size acquisition unit 10D, a storage unit 10E, a determination unit 10F, and a signal output unit 10G. Each of these components may be configured as software or may be configured as hardware in the control unit 10.

The image generation unit 10A generates an X-ray transmission image of the article G on the basis of a detection result of the X-ray detection unit 7. The inspection unit 10B inspects the article G (for example, inspection of the presence or absence of foreign matter in the article G) on the basis of the X-ray transmission image. The calculation unit 10C calculates, on the basis of the X-ray transmission image, the total weight of the articles G conveyed in a predetermined time period (unit time period) by the conveying unit 5. A weight estimation process is performed utilizing the characteristic by which a substance that is thicker in the irradiation direction of the X-rays appears darker on the X-ray transmission image. The calculation unit 10C does not add the weight of one or a plurality of (in the present embodiment, a plurality of) articles G sorted from the conveying unit 5 by the sorting device 12, to the total weight of the articles G. That is, the calculation unit 10C acquires the total weight of the articles G conveyed by the conveying unit 5 in the predetermined time period, excluding the weight of the one or the plurality of articles G sorted from the conveying unit 5. The control unit 10 controls the setting of the article processing device 20 disposed downstream of the conveying unit 5, on the basis of the total weight excluding the weight of the one or the plurality of articles G sorted from the conveying unit 5. For example, the control unit 10 changes the temperature (for example, when the total weight is higher, increases the temperature) of the article processing device 20 disposed in the subsequent stage, in accordance with the total weight excluding the weight of the one or the plurality of articles G sorted from the conveying unit 5.

Figure 5A:
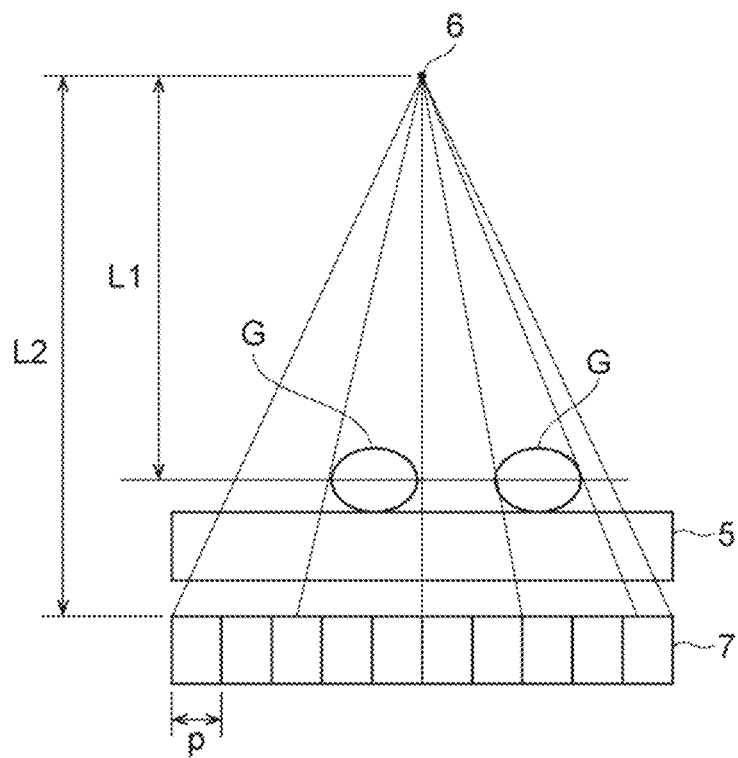
FIG. 5A is a schematic diagram illustrating a peripheral configuration of an X-ray detection unit as viewed in a conveyance direction.
Figure 5B:
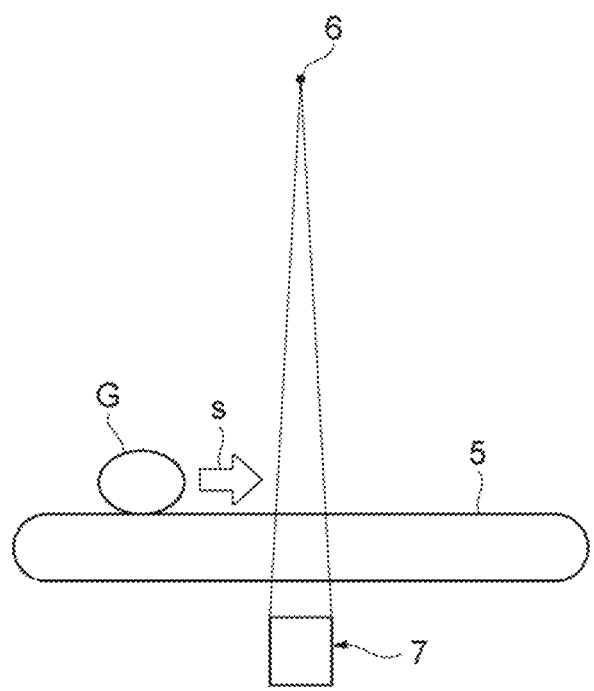
FIG. 5B is a schematic diagram illustrating a peripheral configuration of the X-ray detection unit as viewed in a horizontal direction perpendicular to the conveyance direction.

The size acquisition unit 10D acquires first information related to the size of the article G on the basis of the X-ray transmission image. Specifically, the size acquisition unit 10D first determines a size of an article region in which the article G is present in the X-ray transmission image, that is, a size of the article G on the image (pixel size). The size acquisition unit 10D converts the size of the article G on the image into an actual size which is the actual size of the article G. As illustrated in FIGS. 5A and 5B, the conversion can be realized by Equation (1) below using a similar relationship of a triangle obtained by an arrangement relationship among the article G, the conveying unit 5, the X-ray irradiation unit 6, and the X-ray detection unit 7. The size of the article G can be determined by setting the height of the product. As p×L1/L2 is constant for the X-ray inspection device 1, p×L1/L2 may be collectively calculated as one correction coefficient c.

$$L = P \times p \times L1/L2 \quad (1)$$

L: actual size, P: on-image size, p: pitch of X-ray detection elements in X-ray detection unit 7

L1: distance from X-ray irradiation unit 6 to article G,

L2: distance from X-ray irradiation unit 6 to X-ray detection unit 7

Here, the X-ray detection unit 7 uses, as a scan cycle, p/s obtained from a conveyance speed s and the pitch p in the conveyance direction A of the conveying unit 5, to capture an image. A set value is used for the conveyance speed s; however, there may be an error with respect to the actual speed. Therefore, when the on-image size P is converted into the actual size L, the vertical and horizontal sizes do not coincide with actual sizes, and an article G having actually a rectangular shape may appear as a parallelogram on the X-ray transmission image, for example. Therefore, the size acquisition unit 10D performs a correction process (resizing) of the X-ray transmission image. In the correction process, the sizes in the conveyance direction A and the width direction (a direction along a conveyance surface and orthogonal to the conveyance direction A) of the on-image size P are corrected so that the actual size L converted by Equation (1) above matches the actual measurement value.

Figure 6A:
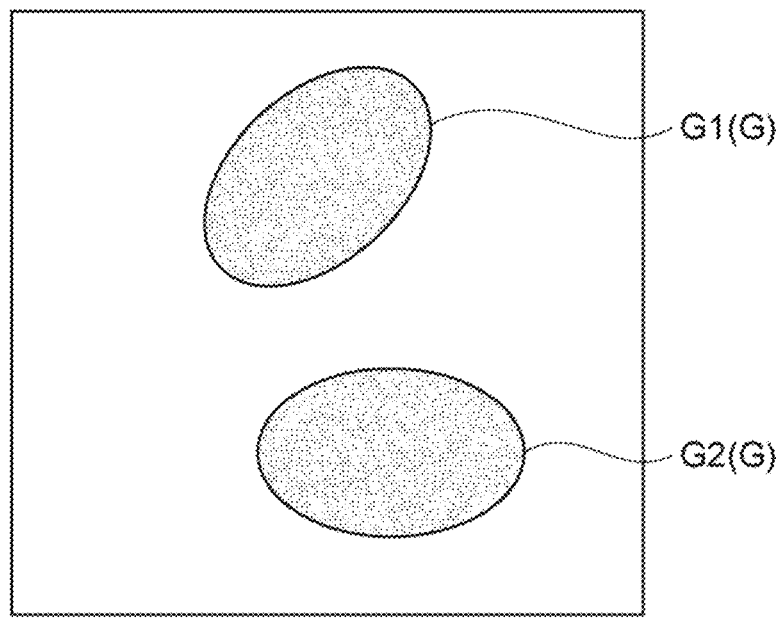
FIG. 6A is a diagram illustrating an example of a size of an article in an X-ray transmission image.
Figure 6B:
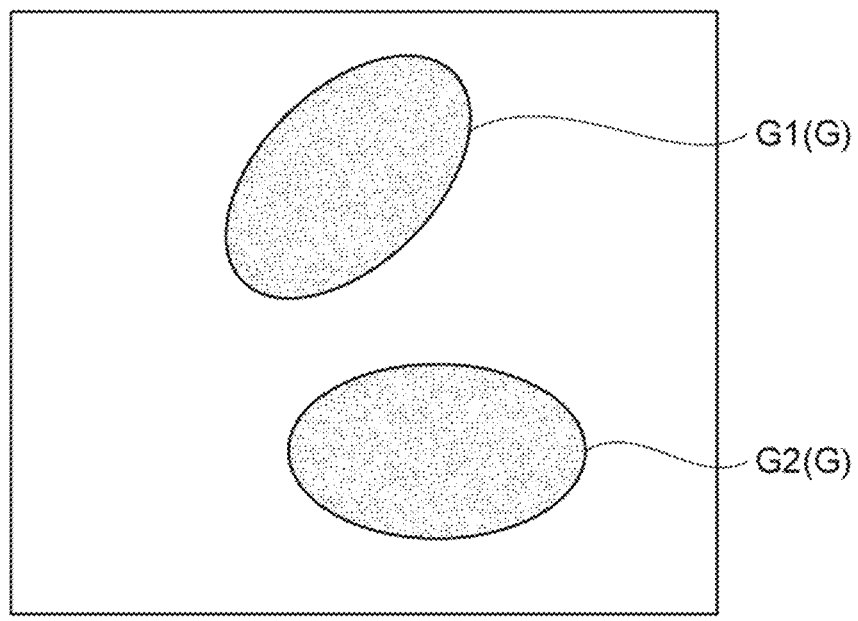
FIG. 6B is a diagram illustrating an example of the size of the article after a correction process in the X-ray transmission image.

The correction process on the X-ray transmission image may be realized by appropriately increasing or decreasing each magnification degree of the X-ray transmission image in the conveyance direction A and the width direction, for example, or may be realized by another method, as long as the size of the actual size L can be adjusted to the actual measurement value. The actual measurement value of the article G can be acquired by actually measuring the article G by a known method. For example, the sizes of articles G1 and G2 illustrated in FIG. 6A can be resized to the sizes of the articles G1 and G2 illustrated in FIG. 6B by performing the correction process.

The storage unit 10E stores second information relating to the width of the passage chute 36 of the weighing and packaging system 30 (that is, a passage port of the combination weighing device 34 disposed downstream of the conveying unit 5, see FIG. 1). Here, the second information is information relating to the diameter of the passage chute 36. When the diameter of the passage chute 36 is not constant, the diameter may be, for example, an average diameter, a minimum diameter, or a maximum diameter. The second information may be input by the operator via the display operation unit 8, may be input by performing communication, or may be input by connecting an external storage medium. That is, the storage unit 10E acquires the second information. The second information may be a fixed value or may be a variable value.

The determination unit 10F determines whether the article G would get stuck in the passage chute 36 on the basis of the first information and the second information. Specifically, when the determination unit 10F determines, on the basis of the first information and the second information, that the article G is larger than the width of the passage chute 36, the control unit 10 determines that the article G would get stuck in the passage chute 36.

More specifically, on the basis of the first information, the determination unit 10F obtains third information relating to the size of the article piece after cutting the article G, and compares the second information and the third information to determine whether the article G would get stuck in the passage chute 36. For example, the determination unit 10F obtains the third information by multiplying the size of the article G serving as the first information, by a parameter Kp (Kp<1) in accordance with a processing mode of the article processing device 20. When the size of the article G (for example, the length of the article G after processing in a longitudinal direction) serving as the third information is larger than the diameter of the passage chute 36 serving as the second information, the determination unit 10F determines that the article G would get stuck in the passage chute 36.

The parameter Kp may be input by the operator via the display operation unit 8, may be input by performing communication, or may be input by connecting an external storage medium. The parameter Kp is not particularly limited, but is set, for example, to a value less than 1, because the article processing device 20 includes a fryer.

The signal output unit 10G outputs a sorting signal to the sorting device 12, so that the sorting device 12 sorts an article G prior to cutting from the conveying unit 5. When the determination unit 10F determines that the article G would get stuck in the passage chute 36, the signal output unit 10G outputs, to the sorting device 12, a sorting signal for sorting the article G from the conveying unit 5. When the article G is a defective article (when the article G is determined as being abnormal) as a result of the inspection by the inspection unit 10B, the signal output unit 10G outputs, to the sorting device 12, the sorting signal for sorting the article G from the conveying unit 5. When receiving the sorting signal, the sorting device 12 starts to operate and sorts the article G and a plurality of articles G in the vicinity of the article G from the conveyance surface of the conveying unit 5.

As described above, the calculation unit 10C of the present embodiment does not add the weight of the plurality of articles G, which are sorted from the conveying unit 5 by the sorting device 12, to the total weight of the articles G. The plurality of articles G sorted from the conveying unit 5 may be, for example, an article G, which the determination unit 10F determines would get stuck in the passage chute 36, and a plurality of articles G present in a predetermined range around the article G. The plurality of articles G sorted from the conveying unit 5 may be, for example, an article G, which the inspection unit 10B determines as being a defective article, and a plurality of articles G present in a predetermined range around the article G. The predetermined range is not particularly limited, but may be, for example, a range corresponding to an imaging range of the X-ray transmission image and a range located before and after the imaging range. In the above description, the X-ray detection unit 7, the size acquisition unit 10D, and the storage unit 10E constitute an acquisition unit. In the above description, the conveying unit 5, the X-ray detection unit 7, and the control unit 10 constitute the article sorting determination device 50.

As described above, in the article sorting determination device 50, when the article G is larger than the width of the passage chute 36 of the weighing and packaging system 30 in the subsequent stage, the control unit 10 determines that the article G would get stuck in the passage chute 36 and outputs the sorting signal. Thus, by causing the sorting device 12 to operate on the basis of the sorting signal, it is possible to sort and remove from the conveying unit 5 an article G that is larger than the width of the passage chute 36. Therefore, it is possible to help prevent the article G from getting stuck in the passage chute 36 of the subsequent stage.

In the article sorting determination device 50, the cutting device 19 that cuts the article G to produce an article piece is disposed in the conveying unit 5. The control unit 10 obtains the third information on the basis of the first information, and when determining, as a result of comparing the second information and the third information, that the article G would get stuck in the passage chute 36, outputs the sorting signal. In this case, it is possible to accurately determine whether the article G would get stuck in the passage chute 36, and it is possible to reliably help prevent the article G from getting stuck in the passage chute 36.

In the article sorting determination device 50, the control unit 10 outputs the sorting signal to the sorting device 12 disposed upstream from the cutting device 19, so that the sorting device 12 sorts an article G prior to cutting from the conveying unit 5. When the article G is larger than a predetermined standard size, the article piece produced by cutting is also relatively large. Therefore, it is possible to prevent the article G from getting stuck by sorting an article G prior to cutting from the conveying unit 5.

In the article sorting determination device 50, the second information is information relating to the width of the passage chute 36 of the combination weighing device 34 disposed downstream of the conveying unit 5. In this case, it is possible to help prevent the article G from getting stuck in the passage chute 36.

In the article sorting determination device 50, the control unit 10 acquires the total weight of the articles G conveyed by the conveying unit 5 in a predetermined time period, excluding the weight of one or a plurality of articles G sorted from the conveying unit 5, and controls a setting of the article processing device 20. In this case, it is possible to appropriately set the article processing device 20. As a result, it is easy to control, for example, the oil temperature of a fryer of the article processing device 20 in a subsequent stage, which can contribute to stabilizing the quality. For example, by changing the temperature of the article processing device 20 in the subsequent stage in accordance with a supply amount of the article G, a product (potato chips) can be produced at an optimum temperature with respect to the supply amount, and thus, the occurrence of defective articles can be prevented. Furthermore, it is possible to prevent a product deformed due to the state of frying from getting stuck. This is because, in the case of a half-fried product, the product does not shrink as much as expected and is likely to get stuck. Also, in the case of a product that is fried too much, deformation of the product progresses and the product gets entangled with other products and is likely to get stuck.

The article sorting determination device 50 further includes the X-ray irradiation unit 6, the X-ray detection unit 7, and the inspection unit 10B. The size acquisition unit 10D acquires first information on the basis of the transmission image. The control unit 10 also outputs the sorting signal when a product is determined as being abnormal as a result of inspecting the product. In this case, an article G different from a predetermined standard, an article G including foreign matter, or foreign matter (for example, a stone or the like) are sorted in advance from the articles G being fed, so that it is possible to prevent an article G from getting stuck or a product from being contaminated with foreign matter. Therefore, it is possible to prevent damage to a device in a subsequent stage (for example, a blade of the cutting device 19).

An embodiment has been described above. However, an aspect of the disclosure is not limited to the embodiment described above.

In the above-described embodiment, the article sorting determination device 50 is applied to the X-ray inspection device 1. However, the application of the article sorting determination device 50 is not limited thereto. The article sorting determination device 50 according to an aspect of the disclosure may be applied to other devices. In the embodiment described above, the passage chute 36 is adopted as the passage port, but the passage port is not particularly limited. Other various types of opening portions may be adopted as the passage port, as long as the opening portion is an opening portion through which the article G passes in a subsequent stage of the conveying unit 5. In the above-described embodiment, the second information may be information relating to the width of the passage port of the member included in the vertical packaging device 35. In the description above, the term "downstream" includes a case in which components are arranged upstream and downstream in series and a case in which a component is disposed on the downstream side of the device.

While preferred embodiments of the disclosure have been described above, it is to be understood that variations and modifications will be apparent to those skilled in the art without departing from the scope and spirit of the disclosure. The scope of the disclosure, therefore, is to be determined solely by the following claims.

The invention claimed is:

1. An article sorting determination device, comprising:
 a conveying unit configured to convey an article;
 an acquisition unit configured to acquire first information and second information, the first information relating to a size of the article being conveyed by the conveying unit and the second information relating to a width of a passage port through which the article passes through downstream of the conveying unit; and
 a control unit configured to output a sorting signal for sorting the article from the conveying unit when determining that the article would get stuck in the passage port on the basis of the first information and the second information.

2. The article sorting determination device according to claim 1,
 wherein a cutting device configured to cut the article to produce an article piece is disposed in the conveying unit, and
 the control unit obtains third information relating to a size of the article piece after cutting the article on the basis of the first information and outputs the sorting signal when comparing the second information and the third information and thereby determining that the article would get stuck in the passage port.

3. The article sorting determination device according to claim 2,
 wherein the control unit outputs the sorting signal to a sorting device disposed upstream from the cutting device and causes the sorting device to sort the article prior to cutting from the conveying unit.

4. The article sorting determination device according to claim 1,
 wherein the second information is information relating to a width of a passage port of a member included in a combination weighing device or a vertical packaging device disposed downstream of the conveying unit.

5. The article sorting determination device according to claim 1,
 wherein the control unit acquires a total weight of the articles conveyed in a predetermined time period by the conveying unit, excluding a weight of one or more of the articles sorted from the conveying unit, and controls a setting of an article processing device disposed downstream of the conveying unit.

6. The article sorting determination device according to claim 1, further comprising:
 an X-ray irradiation unit configured to irradiate the article being conveyed by the conveying unit with X-rays;
 a detection unit configured to detect the X-rays transmitted through the article; and
 an inspection unit configured to generate a transmission image on the basis of the X-rays detected by the detection unit and inspect the article by using the transmission image that is generated,
 wherein the acquisition unit acquires the first information on the basis of the transmission image, and
 the control unit outputs a sorting signal for sorting the article from the conveying unit even when determining that the article is abnormal as a result of the inspection.

* * * * *